Oct. 6, 1959     F. W. KENDALL     2,907,098
TURRET LATHES

Filed April 10, 1956     5 Sheets-Sheet 1

Inventor
*Frederick W. Kendall*
By
*Chsnow &Ceo.* Attorney

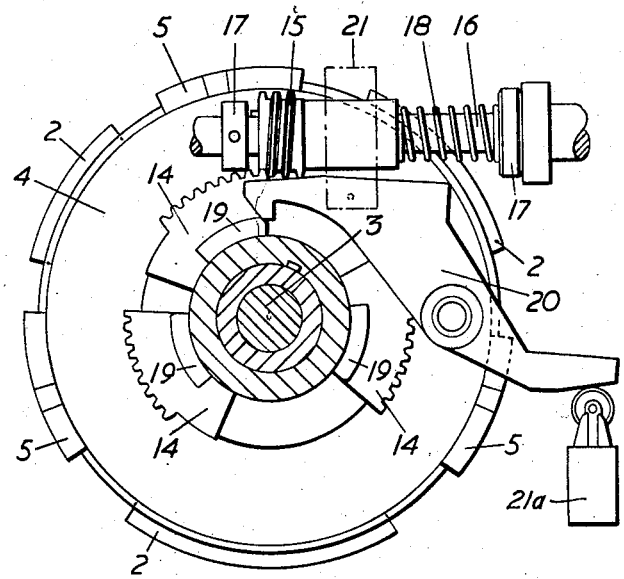
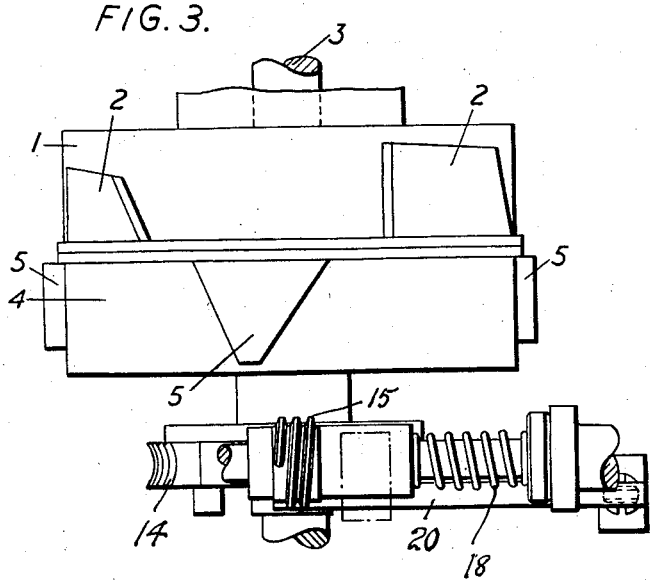

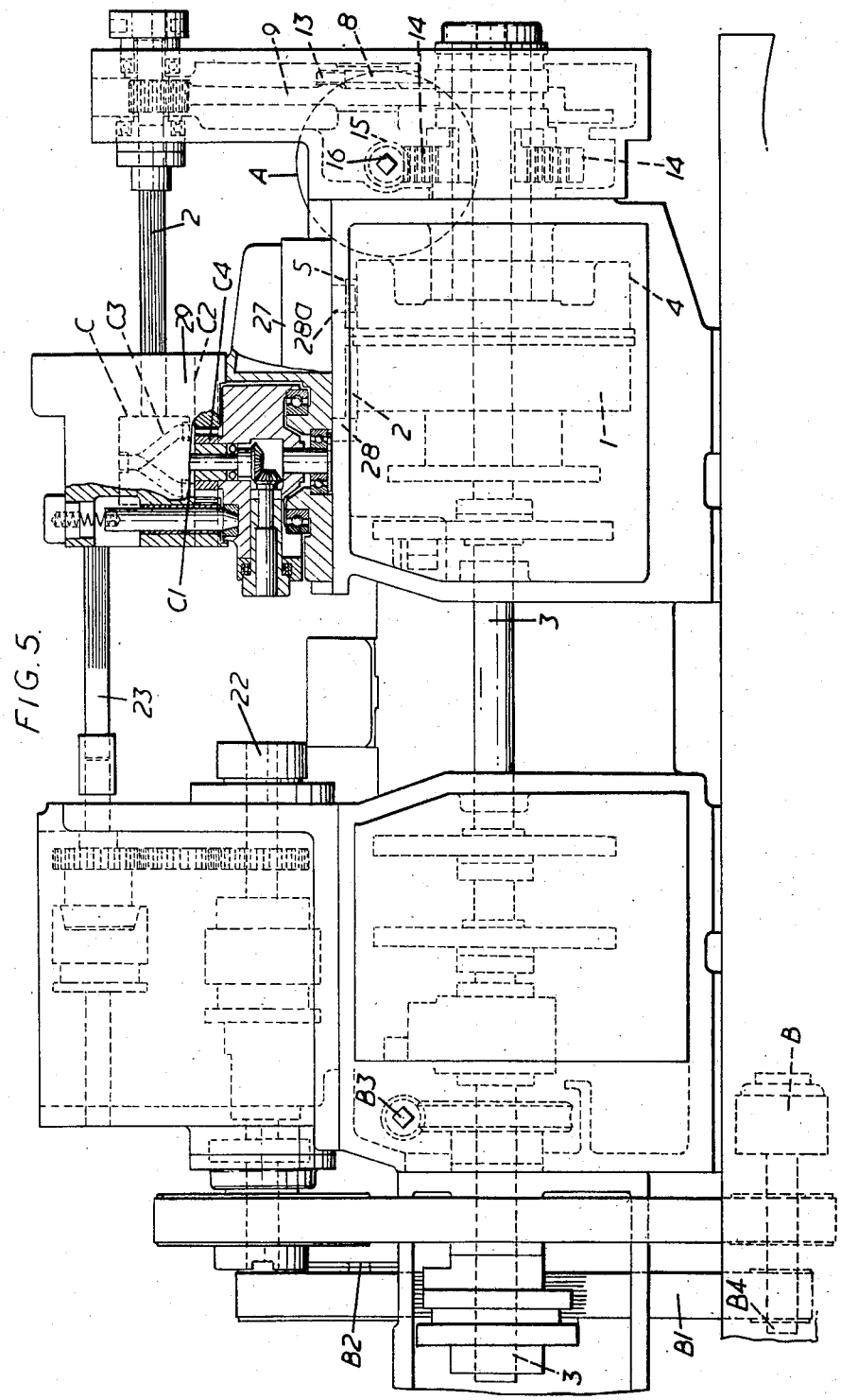

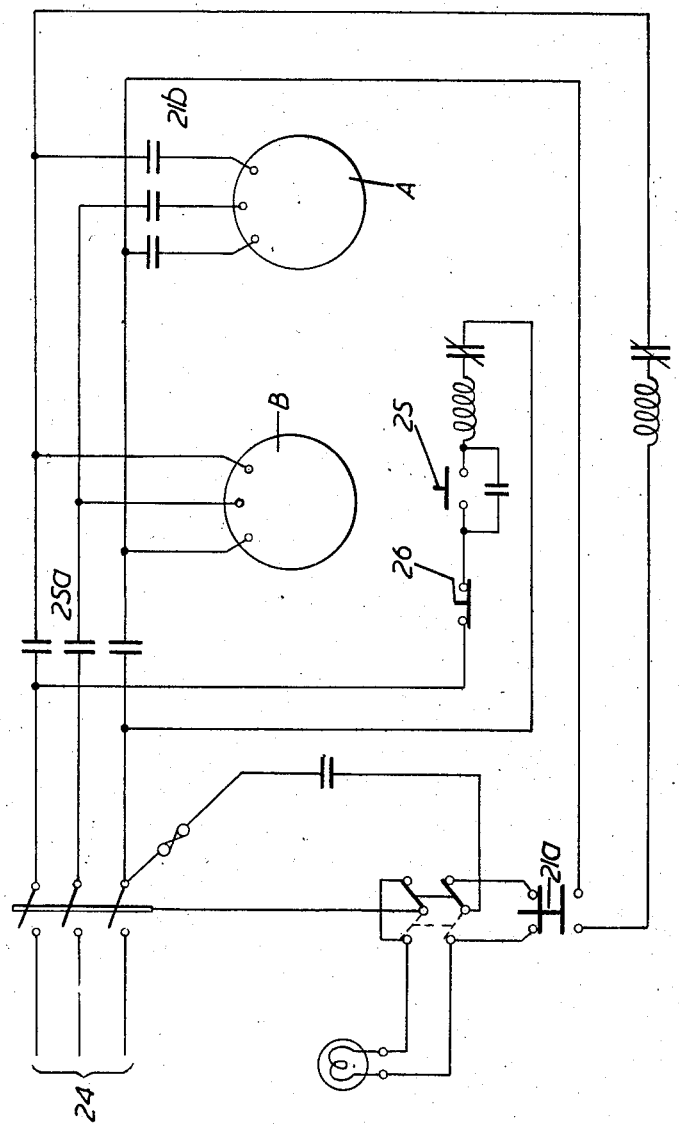

United States Patent Office 2,907,098
Patented Oct. 6, 1959

2,907,098
TURRET LATHES
Frederick William Kendall, Leamore, Walsall, England
Application April 10, 1956, Serial No. 577,217
2 Claims. (Cl. 29—44)

This invention relates further to an automatic turret lathe and it has for its object to utilize a divided and rotating cam member for effecting the feed and the return indexing movements of the turret of the automatic turret lathe.

A further object of the invention is to provide a divided rotating cam member for effecting the feed and the return and indexing movements of the turret.

Referring to the drawings:

Figure 2 is a section on line II—II showing the feed and return rotating cam member and means for driving the cam returning rotating member.

Figure 3 is a plan view of the parts shown by Figure 2.

Figure 5 is a side elevation of an automatic turret lathe, parts being shown in section, and illustrating in general arrangement, a lathe incorporating a mechanism constructed according to this invention.

Figure 6 is a circuit diagram controlling the electric motors.

Figure 1:
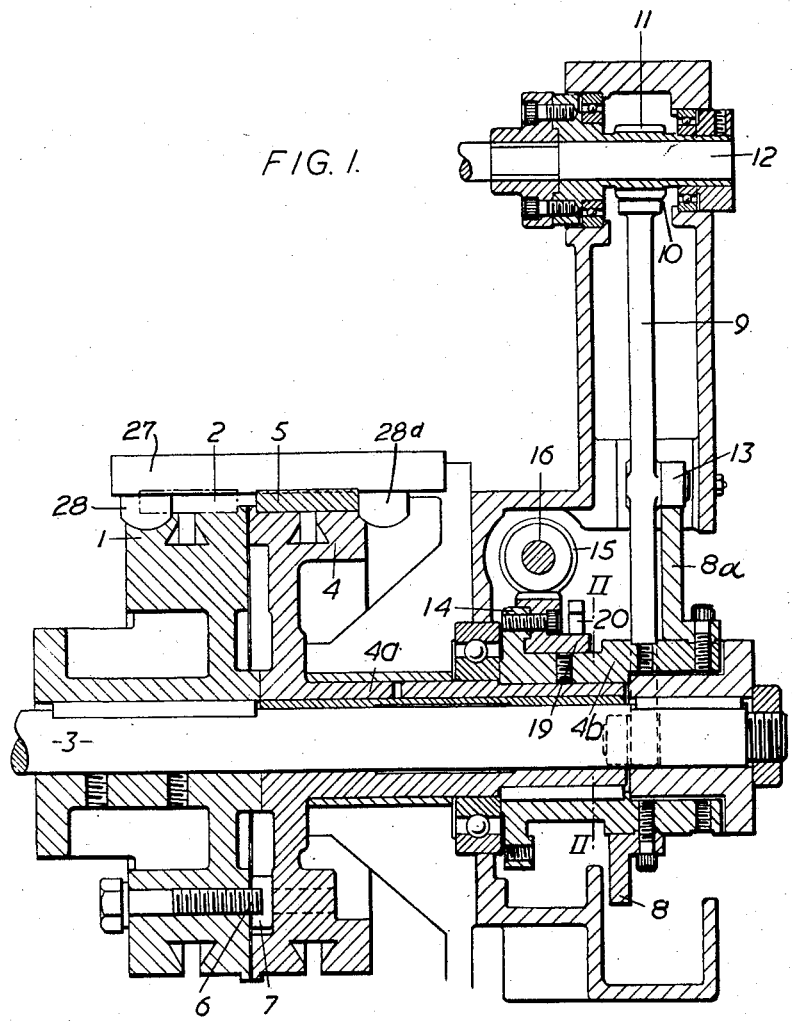
Figure 1 is a cross sectional elevation of a mechanism for operating the feed and return of a capstan and for operating the shaft for indexing the turret.
Figure 4:
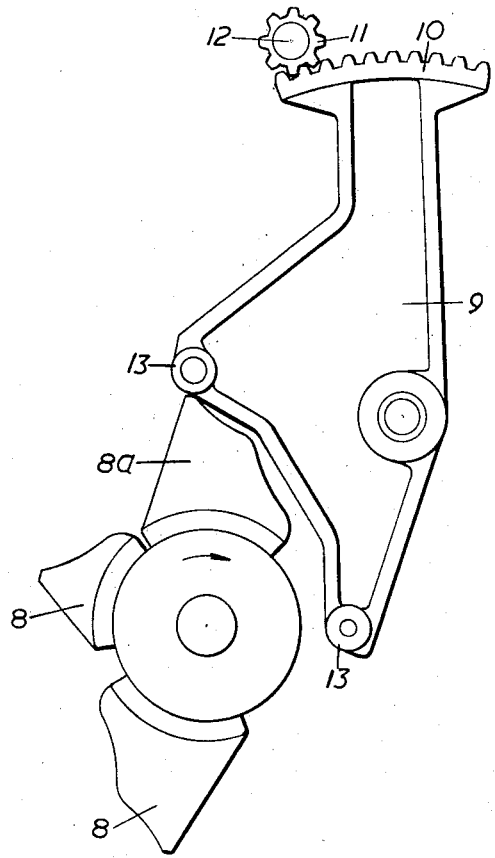
Figure 4 is a view of the lever and cams for operating the turret indexing shaft.

According to a convenient embodiment of the invention, the cam drum or rotating member effecting the feed and the return and indexing movements of the turret is formed in two units, a feeding cam drum or rotating member 1, having cams 2 for feeding the turret forwardly for machining, being fixed on the constantly rotating cam shaft 3, and a turret return and indexing rotating member 4 having cams 5 for returning the turret being rotatable on the cam shaft 3. The feed and return cam effect the movement of the turret in known manner. The turret slide 27 on which the turret 29 is mounted has projections 28 and 28a which co-act with the cams 2 and 5 for effecting respectively the feed and retraction of the turret 29. The feeding cam rotating member 1 drives the turret return and indexing rotating member 4 by means of a dog 6 thereon pushing a dog 7 on the return and indexing member 4, so that this latter member is free to move in advance of the driving dog. The turret return rotating member 4 has a sleeve 4a formed thereon which is free to rotate on the shaft 3. A sleeve 4b is fixed on this sleeve 4a and such sleeve 4b has cams thereon for indexing the turret in the known manner. The cams 8 and 8a swing a lever 9 having a toothed sector 10 at one end in engagement with a toothed wheel 11 on a turret indexing shaft 12, the other end of the lever being forked and having rollers 13 on each forked end for engaging the latter cams 8, 8a. If the turret has three stations, two cams 8 engaging one forked end swing the toothed sector in one direction for successively swinging the turret from the first station to the second and from the second to the third and also another cam 8a for engaging the other forked end swings the turret back to the first station. The sleeve 4b of the turret return cam member 4 has, with a three station turret, three toothed sectors 14 thereon which are successively moved, as the return and indexing member 4 rotates with the feed cam member 1, into position for engagement with a worm 15 on a shaft 16 on the spindle of an electric motor A. This worm is keyed and slidable on the shaft 16 between two collars 17 and is normally pressed by a spring 18 against one collar, and a toothed section 14 moves against the worm and moves the worm axially against the spring, so that the toothed sector is in position for meshing with the worm. A switch cam 19 on each toothed sector 14 is adapted to move a switch lever 20 to press on a micro-switch 21a and switch on the rapid index and return electric motor A and hold the same pressed thereon whilst the toothed sector is being driven by the worm 15. When the said electric motor A is switched on, it drives the worm shaft 16, and through a toothed sector, the return and indexing cam member 4, and takes over the drive from the feed cam member, and thus operates the turret return and indexing at a fast rate. At the end of the worm drive, the said switch cam 19 allows the switch lever 20 to spring return and switch off the electric motor A. The turret feed cam member 1, constantly rotating and driven by the motor B, advances so that the dog drive 6, 7 again engages and advances the turret return and indexing member 4 to proceed in its timed relationship with its cycle of operations, until the next sector 14 advances to the worm wheel 15 for again operating the turret return and indexing member 4. The turret return and indexing member 4 is thus kept in correct timing relative to the feed cam member 1, but is independently operated for the turret return and the indexing of the turret.

A second dog may be provided on the turret return and indexing member 4 to limit the free movement of the drum in relation to the feed cam rotating member 1 and a friction brake may be applied to the rotating member 4 so that it will have a steady movement. To prevent spinning of the worm shaft, when the motor has been switched off, the said switch operating lever 20 pulls down a friction brake 21 when it spring moves into "switch-off" position. The motor B is arranged in the bed frame of the lathe and drives the cam shaft 3 through a belt drive B1 from the motor shaft B4 to the shaft B2 and from the shaft B2 the drive is transmitted to the cam shaft 3 by the shaft B3 and gear wheels thereon. Such motor also drives the work spindle 23 and the turret spindle drive shaft. The motors A and B are connected to the mains supply 24, and the circuit of the motor B is switched on by pressing the button of the switch 25 and switched off by the switch 26. The circuit from the mains supply 24 to the motor A is controlled by the said automatically operated switch 21a. The switch 25 has a master control of the circuit to both motors, so that the motor A cannot be switched on until the motor B is switched on and when the switch 26 is opened both circuits are opened. The switch 25 operates the contactor 25a for the motor B and the switch 21a operates the contactor 21b for the motor A.

The indexing shaft 12, in known manner, has a cam sleeve C thereon with a cam groove circumferentially arranged and, for a three station turret, has two inclined steps therein. A pin C1 on a sliding rack C2 engages the groove C3 and the inclined shoulders formed by the steps move the rack C2 as the sleeve rotates, respectively, to position the turret to the second and third stations and on the reverse movement of the said cam sleeve positions the turret back to the first station. The rack engages a toothed wheel C4 fixed to the swinging turret. The device can be arranged for a two or other station turret and any sequence can be effected.

As previously constructed an automatic turret lathe is operated by cams on a single rotating member.

Having thus described the invention, what is claimed as new and desired to be secured by Letters Patent, is:

1. In an automatic turret lathe, change speed mechanism for effecting the feed and return movements of the turret comprising a divided cam member mounted on a driving shaft and formed of a first rotating member and a second rotating member, the first rotating member being keyed on said shaft which is rotated continuously and at a constant speed by an electric motor and said first rotating member having cams thereon for moving the turret in the feed direction and the second rotating member being rotatably mounted on said shaft and having cams thereon for retracting the turret, a dog on said first rotating member for bearing against a dog on said second rotating member for rotating the latter member whilst leaving such latter member free to be driven in advance of the said first rotating member, by a second electric motor, toothed sectors fixed at intervals on the said second rotating member, gearing driven by said second electric motor and adapted to be engaged by said toothed sectors as the toothed sectors are carried into mesh with said gearing, a cam device on said second rotating member for switching "on" said second motor when a said toothed sector is moved into mesh with said gearing driven by said second motor and for switching "off" said second motor when said toothed sector has moved out of gear, to enable said first rotating member to be moved into driving engagement with said second rotating member.

2. In an automatic turret lathe, change speed mechanism for effecting the feed and return movements of the turret as set forth in claim 1, in which the gearing driven by the electric motor comprises a worm gear adapted to be engaged by a said toothed sector, a shaft on which the worm is mounted having stops between which the worm is slidably mounted, a spring pressing the worm against one stop so that a said toothed sector will slide the worm against spring pressure in order that it is in position to mesh with the worm when the worm commences to rotate.

References Cited in the file of this patent
UNITED STATES PATENTS

| | | |
|---|---|---|
| 2,065,816 | Lovely | Dec. 29, 1936 |
| 2,264,804 | Lovely | Dec. 2, 1941 |
| 2,728,974 | Miller | Jan. 3, 1956 |
| 2,774,250 | Gallimore | Dec. 18, 1956 |